United States Patent
Zhang et al.

(10) Patent No.: US 12,475,723 B2
(45) Date of Patent: Nov. 18, 2025

(54) METHOD AND SYSTEM FOR DETECTING AN OCCUPANCY OF A SEAT

(71) Applicant: Aptiv Technologies AG, Schaffhausen (CH)

(72) Inventors: Xuebing Zhang, Wuppertal (DE); Klaus Friedrichs, Dortmund (DE); Markus Buehren, Erkrath (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 254 days.

(21) Appl. No.: 18/098,245

(22) Filed: Jan. 18, 2023

(65) Prior Publication Data

US 2023/0237815 A1 Jul. 27, 2023

(30) Foreign Application Priority Data

Jan. 21, 2022 (EP) .................................... 22152753

(51) Int. Cl.
*G06T 7/55* (2017.01)
*G06V 20/59* (2022.01)

(52) U.S. Cl.
CPC .............. *G06V 20/593* (2022.01); *G06T 7/55* (2017.01); *G06T 2207/10028* (2013.01); *G06T 2207/30268* (2013.01)

(58) Field of Classification Search
CPC ................... G06V 20/593; G06T 7/55; G06T 2207/10028; G06T 2207/30268; B60R 21/01538; B60N 2/002
USPC ....................................................... 382/103
See application file for complete search history.

(56) References Cited

U.S. PATENT DOCUMENTS

| | | | |
|---|---|---|---|
| 7,376,248 B2 | 5/2008 | Ertl et al. | |
| 10,296,797 B2 | 5/2019 | Porsch | |
| 2005/0131593 A1* | 6/2005 | Terauchi | B60N 2/002 701/22 |
| 2006/0291697 A1* | 12/2006 | Luo | G06V 40/103 382/104 |
| 2007/0143065 A1 | 6/2007 | Griffin et al. | |

(Continued)

FOREIGN PATENT DOCUMENTS

| | | |
|---|---|---|
| CN | 206520507 U | 9/2017 |
| CN | 111507156 A | 8/2020 |
| DE | 19757595 C2 | 5/2000 |

(Continued)

OTHER PUBLICATIONS

Extended European Search Report issued by the European Patent Office in connection with International Application No. 22152753. 4, dated Sep. 2, 2022.

(Continued)

*Primary Examiner* — Stephen P Coleman
(74) *Attorney, Agent, or Firm* — Harness, Dickey & Pierce, P.L.C.

(57) ABSTRACT

Computer implemented method for detecting an occupancy of a seat, comprising capturing, by means of an imaging device, a first image of a seat, the image comprising depth data, determining, by means of a processing device, a first height profile along a first line in the first image from the depth data, and comparing, by means of the processing device, the first height profile with a first reference height profile taken along the same first line to determine whether the seat is occupied.

14 Claims, 5 Drawing Sheets

(56) References Cited

U.S. PATENT DOCUMENTS

2013/0051625 A1* 2/2013 Fan .................. G06V 10/143
                                                      382/104
2018/0079322 A1  3/2018 Tanriover et al.

FOREIGN PATENT DOCUMENTS

| EP | 1792788 A1 | 6/2007 |
| EP | 1674347 B1 | 5/2008 |
| FR | 3054348 A1 | 1/2018 |
| WO | 2020165908 A2 | 8/2020 |

OTHER PUBLICATIONS

First Office Action regarding Chinese Patent Application No. 202310018422.0, dated Jun. 9, 2025. Translation provided by Google.

* cited by examiner

METHOD AND SYSTEM FOR DETECTING AN OCCUPANCY OF A SEAT

CROSS-REFERENCE TO RELATED APPLICATION

This application claims the benefit of European patent application serial number EP 22152753.4 filed on Jan. 21, 2022. The entire contents of which are hereby incorporated by reference herein.

FIELD

The present disclosure relates to methods and systems for detecting an occupancy of a seat, in particular in a vehicle.

BACKGROUND

Digital imaging devices, such as digital cameras, are used in automotive applications to detect passenger occupancies in a vehicle.

Thereby, it is important to detect whether a seat is occupied or unoccupied to control certain functions of the vehicle.

Accordingly, there is a need for improved methods and systems for detecting an occupancy of a seat.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for detecting an occupancy of a seat, comprising capturing, by means of an imaging device, a first image of a seat, the image comprising depth data, determining, by means of a processing device, a first height profile along a first line in the first image from the depth data, and comparing, by means of the processing device, the first height profile with a first reference height profile taken along the same first line to determine whether the seat is occupied.

The method is in particular suitable for detecting a seat occupancy in a vehicle. Therein, the vehicle comprises an imaging device, that is adapted to capture one or more images, in particular of the passenger compartment of the vehicle. The imaging device may be, for example, located on the inside of the roof of the vehicle, in particular the roof liner, and covering at least a portion of the passenger compartment comprising at least one seat. In particular, the imaging device covers the entire passenger compartment with all seats present therein, in a top view or bird's eye view. Particularly there is only a single imaging device provided.

Therein, the imaging device is adapted to capture one or more images comprising depth data and, optionally, intensity data. The imaging device may be, for example, a time-of-flight camera, a stereo camera or a radar camera. The depth data represent, for each pixel, a depth information, which corresponds to a real distance in height.

After capturing the first image, the image may be cropped and filtered. Then, the depth data comprised therein is used to determine a first height profile. A height profile is an accumulation of height values along a given line. The first height profile is determined along a first line. The first line is a line that travels along a cutline through the seat, in particular approximately along the centerline in a direction from front to back of the vehicle. Therein, the line is approximately parallel to a centerline through the vehicle in a direction from front to back of the vehicle. The line may, in particular, be a vertical line.

In a next step, the first height profile determined from the first image is compared with a first reference height profile along the same first line. Therein, the first reference height profile is previously determined from a previously captured image comprising depth data of the same seat when it was unoccupied. In particular, the reference profile may be generated from multiple previously captured images of the same and/or a similar seat. Further, the reference profile may be statistically averaged. In addition, the reference profile may be used to train a machine learning algorithm.

By comparing the first height profile captured from the seat with the first reference height profile captured from the same seat, it is possible to spot deviations in height, indicating that there is an object or a passenger located on the seat at the time of capturing the first image.

According to an embodiment, the method further comprises determining, by means of the processing device, a second height profile along a second line in the first image from the depth data and comparing, by means of the processing device, the second height profile with a second reference height profile taken along the same second line to determine whether the seat is occupied.

The second height profile is determined from the same captured first image, however along a second line, different from the first line. The second line is for example parallel to the first line and offset from the first line in a horizontal direction of the seat to either one of the sides of the vehicle.

Then, the second height profile determined from the first image is compared with a second reference height profile along the same second line. Therein, the second reference height profile is previously determined from a previously captured image comprising depth data of the same seat when it was unoccupied.

By additionally comparing the second height profile captured from the seat with the second reference height profile captured from the same seat, it is possible to spot smaller objects being placed on the seat at the time of capturing the first image, and in particular, objects that are placed not along the first line. Thereby, a spatial resolution of object detection is achieved.

Additionally, more than two height profiles may be determined, for example three, four or five or even more, along respective additional lines, which may be compared to respective reference height profiles. Thereby, a higher spatial resolution is achieved.

According to an embodiment, the method further comprises capturing, by means of the imaging device, a second image of the seat, the image comprising depth data, determining, by means of the processing device, a first height profile along a first line in the second image from the depth data, and comparing, by means of the processing device, the first height profile in the second image with the first height profile in the first image to determine whether the seat is occupied.

Alternatively, or additionally, the method comprises comparing, by means of the processing device, the first height profile in the second image with the first reference height profile to determine whether the seat is occupied.

The second image is captured by the same imaging device of the same seat as the first image, however, at a different time. For example, the second image is captured 100 ms, 500 ms or 1 s, 2 s or 10 s after the first image has been captured.

The first height profile is then determined along the same first line as in the first image. Then, the first height profile determined from the second image may be compared with the first height profile determined from the first image to determine whether the seat is occupied. Alternatively, or additionally, the first height profile determined from the second image may be compared with the first reference height profile to determine whether the seat is occupied.

By comparing the height profile at a second timestamp it is possible to determine a motion, for example of a passenger currently taking the seat or currently getting up from the seat. Thereby, a temporal resolution of object detection is achieved. By comparing height profiles at two different timestamps it is also possible to rule out false positives or only temporary placements of objects on the seat.

Additionally, more than two images may be captured, for example three, four or five or even more, then a first height profile along a first line in the third, fourth, fifth, etc. image from the depth data may be determined and the first height profile in the third, fourth, fifth, etc. image may be compared with the first height profile in the first image and/or with the first reference height profile to determine whether the seat is occupied. Thereby, a higher detection accuracy is achieved.

The first height profile in the first, second third, fourth, fifth, etc. image may be averaged to achieve a first average height profile to be compared with the first reference height profile. Thereby, detection errors can be reduced.

According to an embodiment, the method further comprises determining, by means of the processing device, a second height profile along a second line in the second image from the depth data and comparing, by means of the processing device, the second height profile in the second image with the second height profile in the first image to determine whether the seat is occupied.

Alternatively, or additionally, the method comprises comparing, by means of the processing device, the second height profile in the second image with the second reference height profile to determine whether the seat is occupied.

Thereby, a spatial and temporal resolution of object detection is achieved.

Similarly as for the first height profile, more than two images may be used to determine a second height profile along a second line in the third, fourth, fifth, etc. image from the depth data and the second height profile in the third, fourth, fifth, etc. image may be compared with the second height profile in the second image and/or with the second reference height profile to determine whether the seat is occupied.

The second height profile in the first, second third, fourth, fifth, etc. image may be averaged to achieve a second average height profile to be compared with the second reference height profile.

According to an embodiment, the step of comparing the first height profile in the first image with a first reference height profile comprises comparing at least a first characteristic point along the first line in the first reference height profile with the same position along the first line in the first image to determine whether the seat is occupied.

A characteristic point in general is for example a point along the height profile where the slope has a value higher than a threshold value or has a change in slope higher than a threshold value.

A first typical characteristic point along the line from front to back of the seat may typically occurs at the end of the bottom rest, where the back rest of the seat starts. Therein, the height profile should indicate a slope that changes from a low value, as the bottom rest is approximately parallel to the ground, to a high value, as the back rest is approximately vertical to the ground.

Therein, the method comprises comparing the at least a first characteristic point along the first line in the first reference height profile with the same position along the first line in the first image to determine whether the seat is occupied.

In particular, as the reference height profile does not change, this step for example compares the slope in the first height profile at the same location where the first characteristic point is located in the reference height profile. If the height in the first height profile at that particular point differs by a threshold from the height in the reference height profile, the determination is affirmative that the seat is occupied.

Thereby, a particularly exact and robust determination can be achieved whether the seat is occupied.

According to an embodiment, the step of comparing the first height profile in the first image with a first reference height profile further comprises comparing at least a second characteristic point along the first line in the first reference height profile with the same position along the first line in the first image to determine whether the seat is occupied.

A typical second characteristic point along the line from front to back of the seat may typically occur at the front end of the bottom rest, where the bottom rest starts above the floor of the compartment. Therein, the height profile should indicate a slope that changes from a high value, as the height of the bottom rest increases virtually vertical from the ground, to a low value, as the bottom rest is approximately parallel to the ground.

Thereby, a particularly exact and robust determination can be achieved whether the seat is occupied.

According to an embodiment, the step of comparing the second height profile in the first image with a second reference height profile comprises comparing at least a first characteristic point along the second line in the second reference height profile with the same position along the second line in the first image to determine whether the seat is occupied.

According to an embodiment, the step of comparing the second height profile in the first image with a second reference height profile further comprises comparing at least a second characteristic point along the second line in the second reference height profile with the same position along the second line in the first image to determine whether the seat is occupied.

According to an embodiment, the step of comparing is performed by using a machine-learning algorithm. The machine learning algorithm may be in particular a neural network, further in particular a convolutional neural network.

According to an embodiment, the step of comparing, the first, second, third, fourth, fifth, etc. height profile with a first, second, third, fourth, fifth, etc. reference height profile in the first, second, third, fourth, fifth, etc. picture may be used to classify a type of an object occupying the seat.

In another aspect, the present disclosure is directed at a computer system, said computer system being configured to carry out several or all steps of the computer implemented method described herein.

The computer system may comprise a processing device, at least one memory device and at least one non-transitory data storage device. The non-transitory data storage device and/or the memory device may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Exemplary embodiments and functions of the present disclosure are described herein in conjunction with the following drawings, showing schematically.

DETAILED DESCRIPTION

Figure 1:
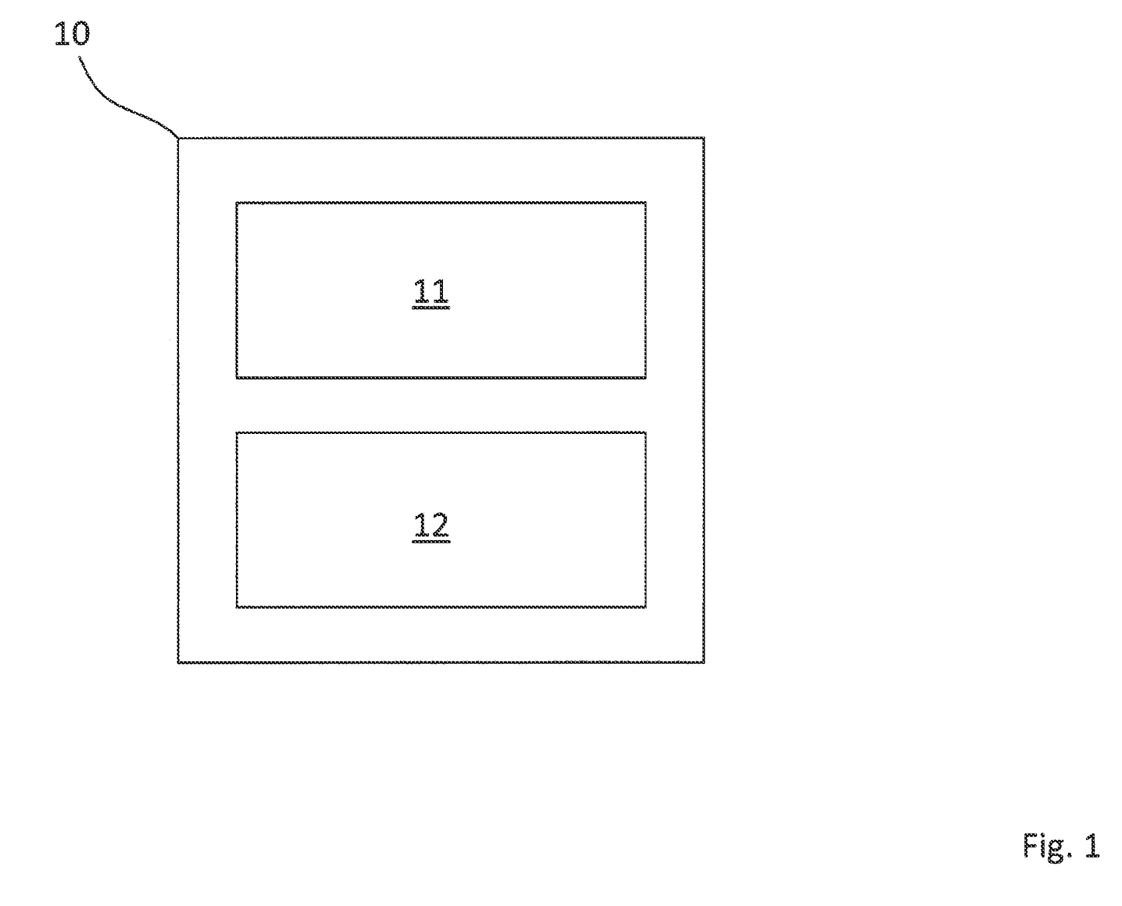
FIG. 1 an embodiment of a computer system carrying out a method for detecting an occupancy of a seat.

FIG. 1 depicts an embodiment of a computer system 10 for detecting an occupancy of a seat. The computer system 10 comprises a processing device 11 and an imaging device 12.

Therein, the computer system 10 is adapted to capture, by means of the imaging device 11, a first image of a seat, the image comprising depth data, to determining, by means of the processing device 12, a first height profile along a first line in the first image from the depth data and to compare, by means of the processing device 11, the first height profile in the first image with a first reference height profile taken along the same first line to determine whether the seat is occupied.

The computer system 10 is further adapted to determine, by means of the processing device 11, a second height profile along a second line in the first image from the depth data and to compare, by means of the processing device 11, the second height profile in the first image with a second reference height profile taken along the same second line to determine whether the seat is occupied.

The computer system 10 is further adapted to capture, by means of the imaging device 12, a second image of the seat, the image comprising depth data, to determine, by means of the processing device 11, a first height profile along a first line in the second image from the depth data and to compare, by means of the processing device 11, the first height profile in the second image with the first height profile in the first image and/or the first reference height profile to determine whether the seat is occupied.

The computer system 10 is further adapted to determine, by means of the processing device 11, a second height profile along a second line in the second image from the depth data and to compare, by means of the processing device 11, the second height profile in the second image with the second height profile in the first image and/or the second reference height profile to determine whether the seat is occupied.

Figure 2:
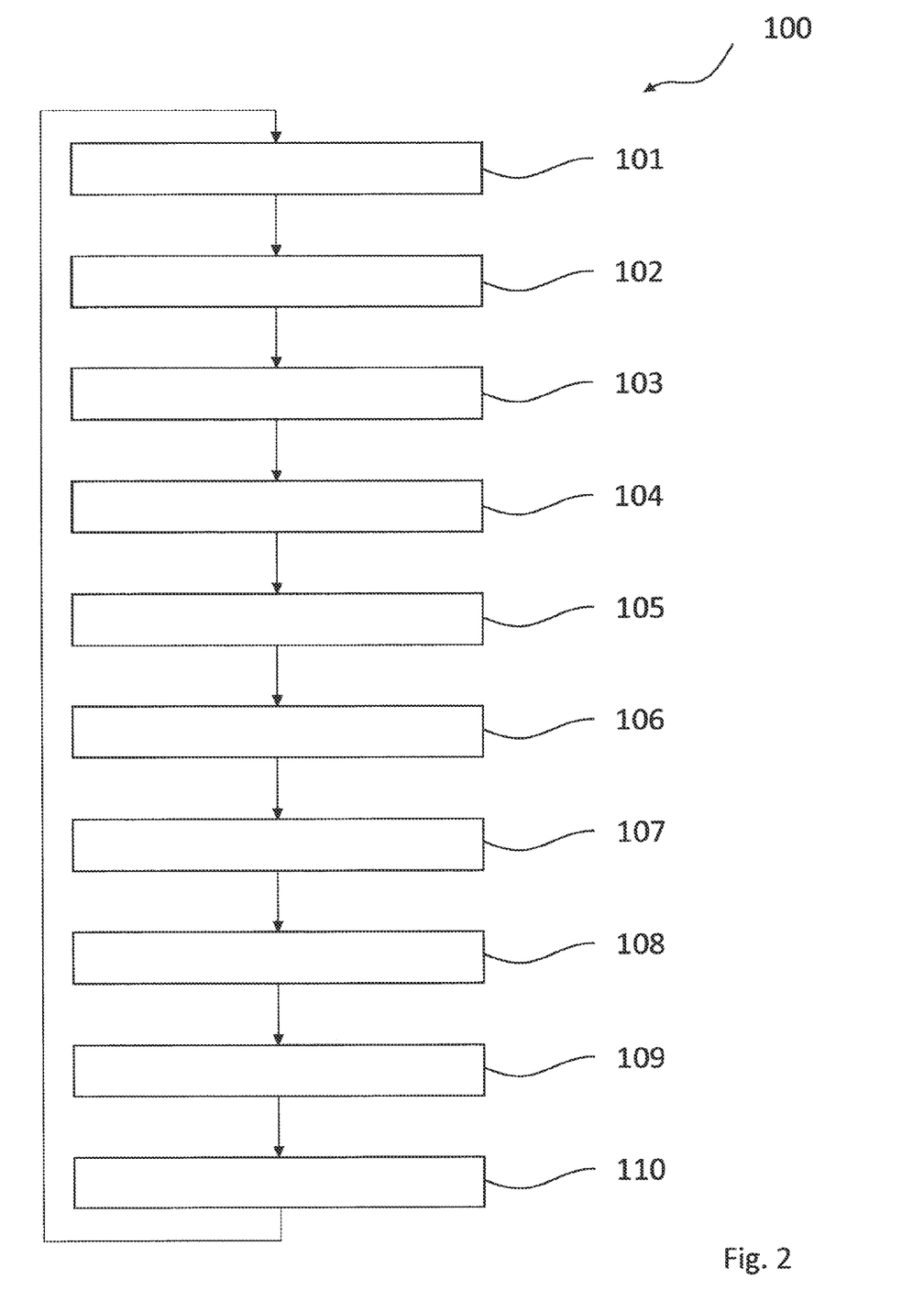
FIG. 2 an embodiment of a flow chart of a method for detecting an occupancy of a seat.

FIG. 2 depicts an embodiment of a flow chart of a method 100 for detecting an occupancy of a seat.

Therein, in a first step 101 a first image of a seat is captured, the image comprising depth data.

In a further step 102 a first height profile along a first line in the first image from the depth data is determined.

In a further step 103 the first height profile in the first image is compared with a first reference height profile taken along the same first line is to determine whether the seat is occupied.

Additionally, the method further comprises in step 104 determining a second height profile along a second line in the first image from the depth data.

In a further step 105 the second height profile in the first image is compared with a second reference height profile taken along the same second line to determine whether the seat is occupied.

Additionally, the method further comprises in step 106 capturing a second image of the seat, the image comprising depth data.

In a further step 107, a first height profile along a first line in the second image from the depth data is determined.

In a further step 108, the first height profile in the second image with the first height profile in the first image and/or the first reference height profile to determine whether the seat is occupied.

Additionally, the method further comprises in step 109 determining a second height profile along a second line in the second image from the depth data.

In a further step 110 and the second height profile in the second image is compared with the second height profile in the first image and/or the second reference height profile to determine whether the seat is occupied.

The method 100 may be repeated periodically or in particular upon starting of an engine or unlocking a vehicle.

Figure 3:
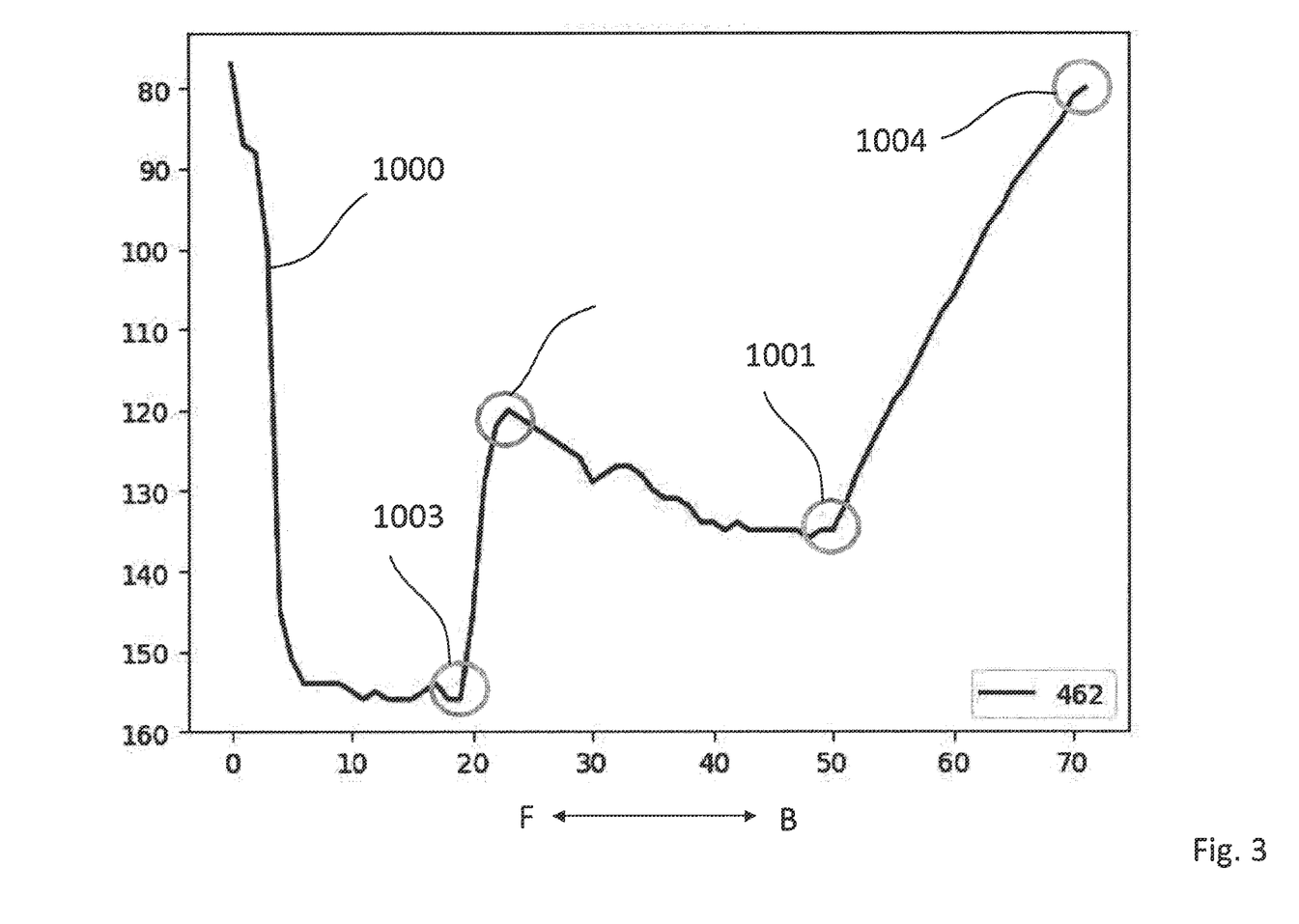
FIG. 3 an example of a reference height profile being used by a method for detecting an occupancy of a seat.

FIG. 3 depicts an example of a first reference height profile 1000 being used by a method for detecting an occupancy of a seat.

Therein, the reference height profile 1000 represents an unoccupied seat. As can be seen in FIG. 3 the reference height profile is taken approximately along the center line of a seat from front F to back B of a vehicle, wherein the horizontal axis represents a direction from front F to back B of the vehicle and the vertical axis represent the height at any given point.

As further can be seen from FIG. 3, there are four characteristic points 1001, 1002, 1003 and 1004. The first characteristic point 1001 is at the end of the bottom rest and the beginning of the back rest. The second characteristic point 1002 is at the beginning of the bottom rest. The third characteristic point 1003 is on the floor in front of the seat. The fourth characteristic point 1004 is at the end of the back rest and thus at the end of the seat.

The characteristic points, or critical points, can be determined by using a derivative method, namely to calculate the gradient of every point and to select the relevant characteristic points based on statistic data.

Therein, the derivation may be represented by the slope of the tangent, which may not only indicate the relationship between a current point investigated and the previous point but also interpret the direction of changes. Thus, the derivation of every point is calculated and the characteristic points are extracted based on the tendency of the height profile.

Figure 4:
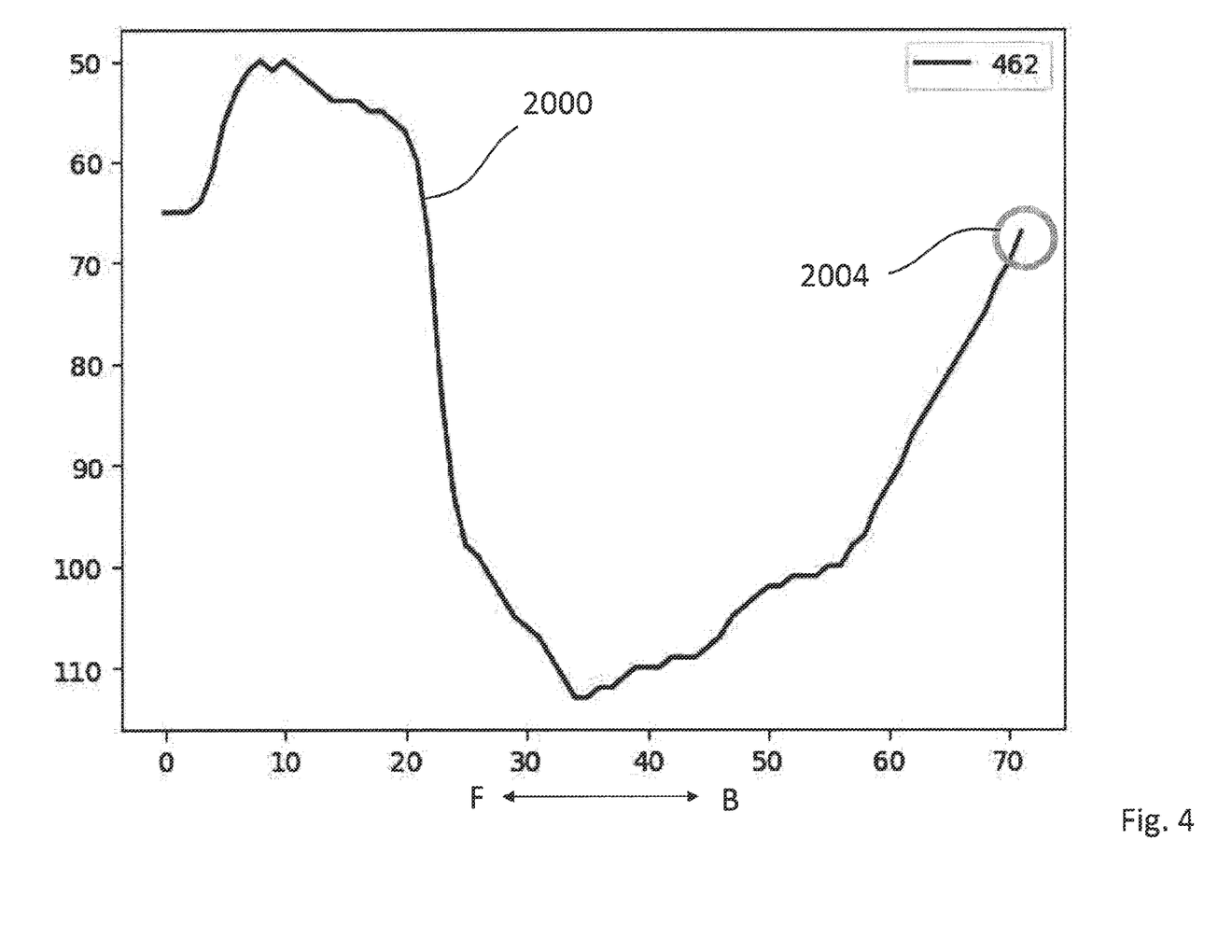
FIG. 4 an example of a height profile being determined by using a method for detecting an occupancy of a seat.

FIG. 4 depicts an example of a first height profile 2000 being determined by using a method for detecting an occupancy of a seat. This first height profile 2000 represents the height profile of a child seat being mounted facing rearwards from the forward driving direction.

As can be seen in FIG. 4, only one single characteristic point 2004 is determined in the first height profile 2000, thus indicating that the seat is occupied. Further, from the characteristic height profile it can be determined not only that the seat is occupied by an object but also the type of object may be classified, namely, a rear-facing child seat. In this case, upon determining the type of object, an airbag may be automatically switched off. The classification may in particular be performed by use of a decision tree.

Figure 5:
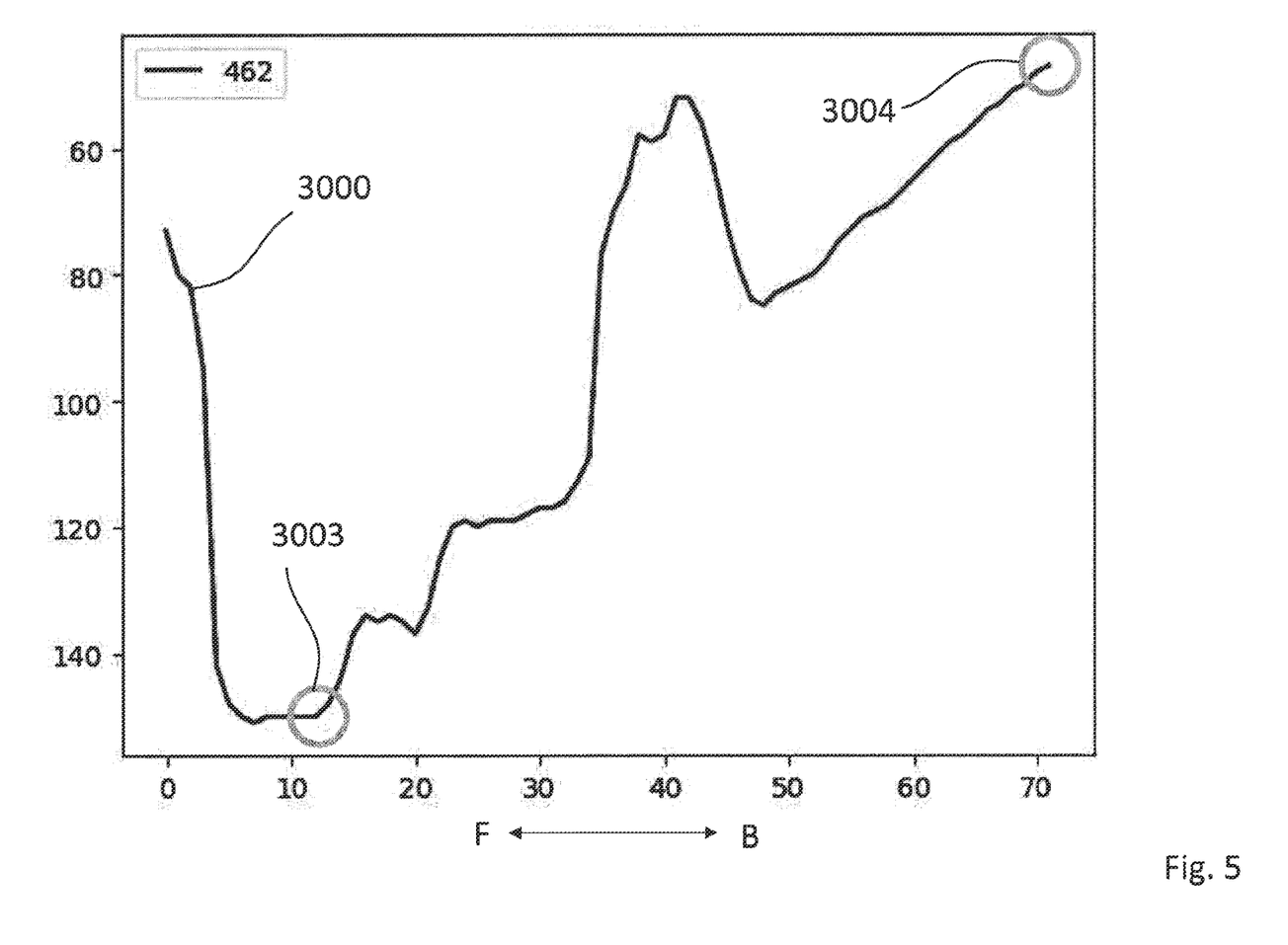
FIG. 5 another example of a height profile being determined by using a method for detecting an occupancy of a seat.

FIG. 5 depicts an example of a second height profile 3000 being determined by using a method for detecting an occupancy of a seat. This second height profile 3000 represents the height profile of a passenger sitting in the seat, moving his arm upwards.

As can be seen in FIG. 5, only two characteristic points 3003, 3004 are determined in the second height profile 3000, thus indicating that the seat is occupied. Further, from the characteristic height profile it can be determined not only that the seat is occupied by an object but also the type of object may be classified, namely, a passenger. In this case, upon determining the type of object, an airbag may be automatically switched on, if it was previously switched off. The classification may in particular be performed by use of a decision tree.

REFERENCE NUMERAL LIST

10 computer system
11 processing device
12 imaging device
100 method
101 method step
102 method step
103 method step
104 method step
105 method step
106 method step
107 method step
108 method step
109 method step
110 method step
1000 first reference height profile
1001 first characteristic point in first reference height profile
1002 second characteristic point in first reference height profile
1003 third characteristic point in first reference height profile
1004 fourth characteristic point in first reference height profile
2000 first height profile
2001 first characteristic point in first height profile
2002 second characteristic point in first height profile
2003 third characteristic point in first height profile
2004 fourth characteristic point in first height profile
3000 second height profile
3001 first characteristic point in second height profile
3002 second characteristic point in second height profile
3003 third characteristic point in second height profile
3004 fourth characteristic point in second height profile

The invention claimed is:

1. Computer implemented method for detecting an occupancy of a seat;
the method comprising:
capturing, by means of an imaging device, a first image of a seat, the image comprising depth data;
determining, by means of a processing device, a first height profile along a first line in the first image from the depth data;
comparing, by means of the processing device, the first height profile in the first image with a first reference height profile taken along the same first line to determine whether the seat is occupied;
determining, by means of the processing device, a second height profile along a second line in the first image from the depth data; and
comparing, by means of the processing device, the second height profile in the first image with a second reference height profile taken along the same second line to determine whether the seat is occupied.

2. Computer implemented method according to claim 1, the method further comprising:
capturing, by means of an imaging device, a second image of the seat, the image comprising depth data;
determining, by means of the processing device, a first height profile along a first line in the second image from the depth data; and
comparing, by means of the processing device, the first height profile in the second image with the first height profile in the first image and/or the first reference height profile to determine whether the seat is occupied.

3. Computer implemented method according to the previous claim 2, the method further comprising:
averaging the first height profile along the first line in the first image with the first height profile along the first line in the second image to obtain a first average height profile; and
comparing the first average height profile with the first reference height profile to determine whether the seat is occupied.

4. Computer implemented method according to claim 2, the method further comprising:
determining, by means of the processing device, a second height profile along a second line in the second image from the depth data; and
comparing, by means of the processing device, the second height profile in the second image with the second height profile in the first image and/or the second reference height profile to determine whether the seat is occupied.

5. Computer implemented method according to the previous claim 4, the method further comprising:
averaging the second height profile along the second line in the first image with the second height profile along the second line in the second image to obtain a second average height profile; and
comparing the second average height profile with the second reference height profile to determine whether the seat is occupied.

6. Computer implemented method according to claim 1, wherein comparing the first height profile in the first image with a first reference height profile comprises comparing at least a first characteristic point along the first line in the first reference height profile with the same position along the first line in the first image to determine whether the seat is occupied.

7. Computer implemented method according to the previous claim 6, wherein comparing the first height profile in the first image with a first reference height profile further comprises comparing at least a second characteristic point along the first line in the first reference height profile with the same position along the first line in the first image to determine whether the seat is occupied.

8. Computer implemented method according to claim 1, wherein comparing the second height profile in the first image with a second reference height profile comprises comparing at least a first characteristic point along the second line in the second reference height profile with the same position along the second line in the first image to determine whether the seat is occupied.

9. Computer implemented method according to the previous claim 8, wherein comparing the second height profile in the first image with a second reference height profile further comprises comparing at least a second characteristic point along the second line in the second reference height profile with the same position along the second line in the first image to determine whether the seat is occupied.

10. Computer implemented method according to claim 1, wherein the comparing is performed by using a machine-learning algorithm.

11. Computer implemented method according to claim 1, the method further comprising:
   classifying a type of an object occupying the seat based on the comparison.

12. Computer system, the computer system being configured to carry out the computer implemented method of claim 1.

13. Non-transitory computer readable medium comprising instructions for carrying out the computer implemented method of claim 1.

14. Computer implemented method for detecting an occupancy of a seat; the method comprising:
   capturing, by means of an imaging device, a first image of a seat, the image comprising depth data;
   determining, by means of a processing device, a first height profile along a first line in the first image from the depth data;
   comparing, by means of the processing device, the first height profile in the first image with a first reference height profile taken along the same first line to determine whether the seat is occupied;
   capturing, by means of an imaging device, a second image of the seat, the image comprising depth data;
   determining, by means of the processing device, a first height profile along a first line in the second image from the depth data; and
   comparing, by means of the processing device, the first height profile in the second image with the first height profile in the first image and/or the first reference height profile to determine whether the seat is occupied.

* * * * *